(12) United States Patent
Champagne et al.

(10) Patent No.: US 12,458,185 B2
(45) Date of Patent: Nov. 4, 2025

(54) HYDROPHOBIC FIELD

(71) Applicant: Kohler Co., Kohler, WI (US)

(72) Inventors: Jeffrey Champagne, Acton, MA (US); Jason Kwacz, Kohler, WI (US)

(73) Assignee: Kohler Co., Kohler, WI (US)

( * ) Notice: Subject to any disclaimer, the term of this patent is extended or adjusted under 35 U.S.C. 154(b) by 848 days.

(21) Appl. No.: 17/730,926

(22) Filed: Apr. 27, 2022

(65) Prior Publication Data
US 2022/0354320 A1    Nov. 10, 2022

Related U.S. Application Data (60) Provisional application No. 63/184,530, filed on May 5, 2021.

(51) Int. Cl.
*A47K 13/30* (2006.01)
*B03C 9/00* (2006.01)

(52) U.S. Cl.
CPC ............ *A47K 13/302* (2013.01); *A47K 13/30* (2013.01); *B03C 9/00* (2013.01)

(58) Field of Classification Search
CPC ........ A47K 13/302; A47K 13/30; H02N 1/04; E03D 9/00
See application file for complete search history.

(56) References Cited

U.S. PATENT DOCUMENTS

| | | | |
|---|---|---|---|
| 5,486,337 A * | 1/1996 | Ohkawa | B01L 3/5088 239/690 |
| 5,644,801 A | 7/1997 | Zhao et al. | |
| 6,215,221 B1 | 4/2001 | Cabuz et al. | |
| 7,052,244 B2 * | 5/2006 | Fouillet | H02N 11/006 417/48 |
| 8,709,137 B2 | 4/2014 | Chan et al. | |
| 9,421,291 B2 | 8/2016 | Robert et al. | |
| 10,548,439 B2 | 2/2020 | Gagnon et al. | |
| 2009/0119942 A1 | 5/2009 | Aisenberg et al. | |
| 2009/0134009 A1 | 5/2009 | Roux et al. | |
| 2022/0356689 A1 * | 11/2022 | Kwacz | E03D 11/00 |

FOREIGN PATENT DOCUMENTS

| | | |
|---|---|---|
| CN | 112302129 A | 2/2021 |
| DE | 202009004228 U1 | 9/2009 |
| WO | 9733527 A1 | 9/1997 |

\* cited by examiner

*Primary Examiner* — David J Laux
(74) *Attorney, Agent, or Firm* — Lempia Summerfield Katz LLC (57) ABSTRACT

An apparatus for generation and application of a hydrophobic effect in a bathroom fixture including an electrostatic generator, a liquid shielded object, and a bowl or basin. The electrostatic generator is configured to generate an electrostatic field configured to repel liquid. The liquid shielded object is positioned in relationship to the electrostatic generator. The bowl or basin is configured to collected liquid repelled away from the liquid shielded object by the electrostatic field.

20 Claims, 9 Drawing Sheets

HYDROPHOBIC FIELD

This application claims priority benefit of Provisional Application No. 63/184,530 filed May 5, 2021, which is hereby incorporated by reference in its entirety.

FIELD

The present application relates electrostatic forces to repel liquids.

BACKGROUND

Electrostatics involves the buildup of charge on the surface of objects. When one of the objects has a high resistance to the flow of charge, the charge buildup may become relatively stronger and affects easily observed. One observation is when the charge finds a quick path to the ground, for example the discharge from a human body by a static shock. Typically, there is no impact of the occurrence of electrostatics or discharge thereof, however, small forces applied in specific situations may provide useful features in the following embodiments.

BRIEF DESCRIPTION OF THE DRAWINGS

Exemplary embodiments are described herein with reference to the following drawings, according to an exemplary embodiment.

DETAILED DESCRIPTION

With general reference to the Figures, disclosed herein are systems have electrostatic fields or other types of hydrophobic fields that repel water, water droplets, or other liquids (e.g., urine). The term hydrophobic effect may include the observable tendency of one or more surfaces and/or materials to exhibit repelling water, water droplets, or other liquids (e.g., urine). An electrostatic field may cause the hydrophobic effect at the surface and/or material or in a volume of space or air near the surface or volume. Repelling may mean applying a force to the water, water droplets, or other liquid in a direction determined by the electrostatic field. The volume of space or air in which the force is applied may be referred to as a hydrophobic field. Some embodiments include toilets, other embodiments include hand dryers, and other example devices that harness hydrophobic fields to direct or repel liquids are possible. Still other embodiments include surfaces such as countertops, mirrors, and other surfaces encountered a bathroom or kitchen, or other space commonly in contact with water.

The electrostatic field generator to repel water may be installed on a variety of plumbing fixtures and/or bathroom fixtures. Plumbing fixtures may be water consuming devices installed to couple to a plumbing system. Plumbing fixtures may include, for example, toilets, sinks, showers, bathtubs, steam generators, hot tubs, bidets, urinals, etc. Bathroom fixtures may or may not be water consuming devices and may be installed in a bathroom setting. Bathroom fixtures may include toilets, sinks, countertops, showers, bathtubs, steam generators, hot tubs, bidets, urinals, hand dryers, dry toilets, etc.

Figure 1:
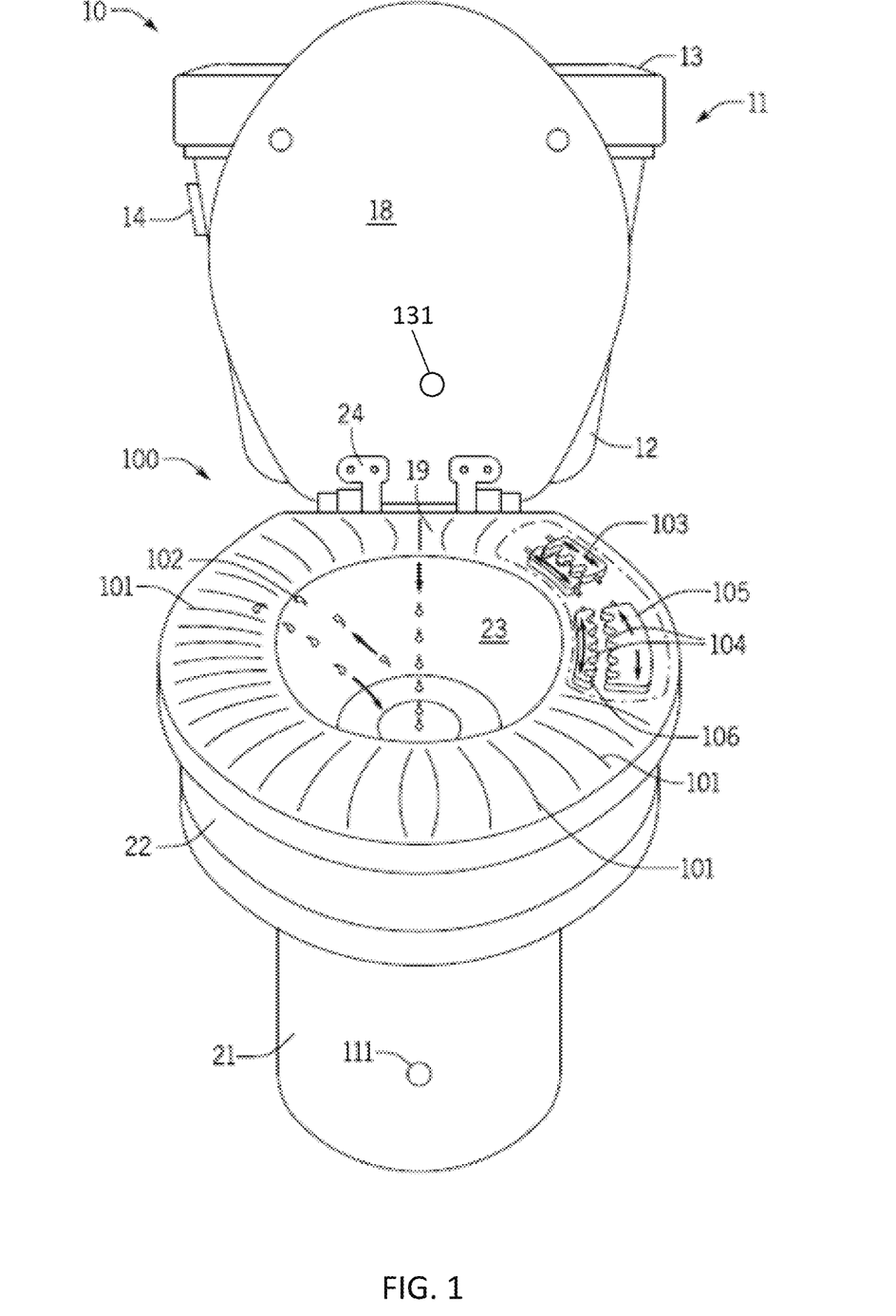
FIG. 1 illustrates an example toilet including a hydrophobic field and a passive generator.
Figure 2:
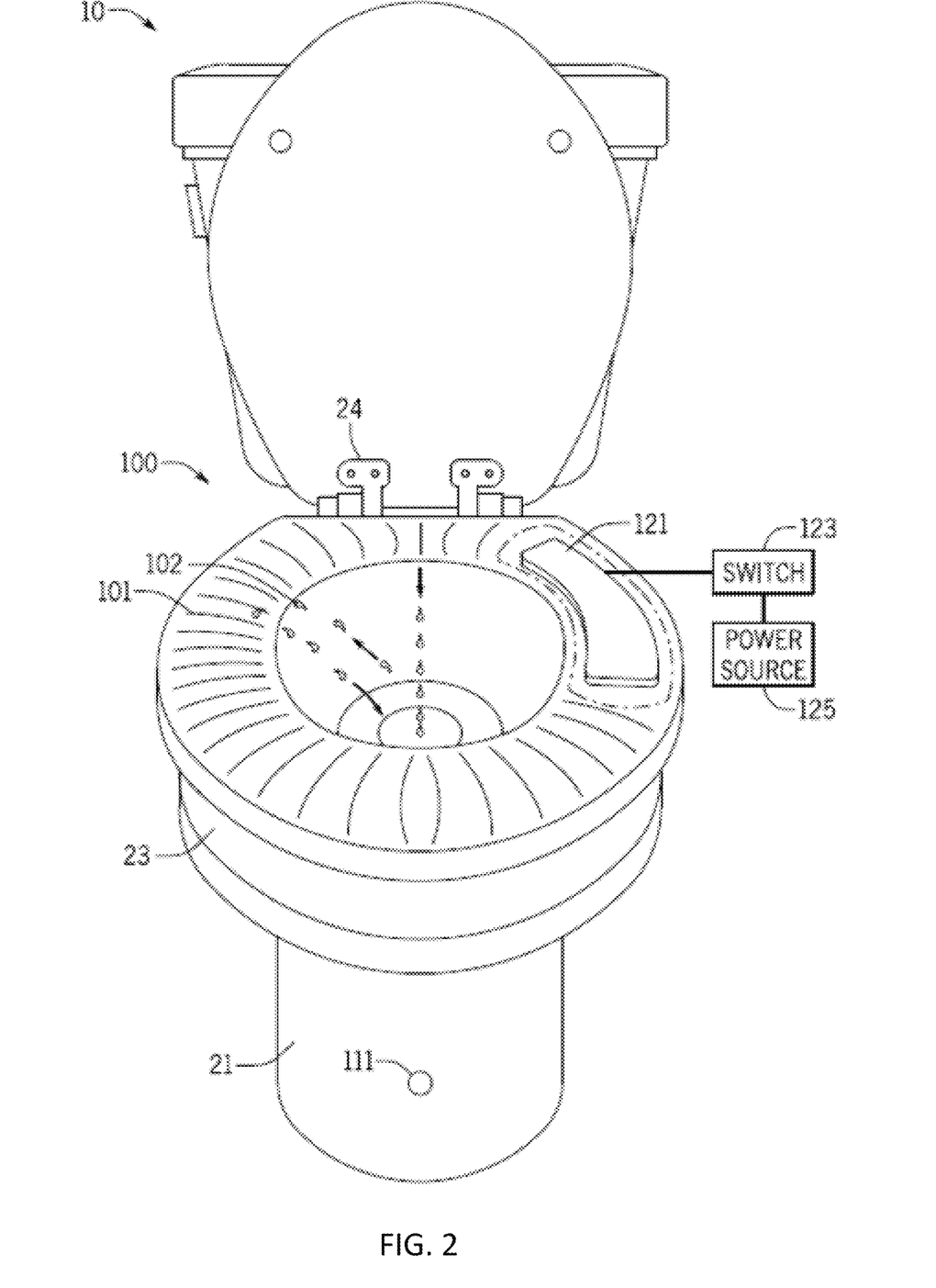
FIG. 2 illustrates an example toilet including a hydrophobic field and an active generator.

FIGS. 1 and 2 illustrate toilets. FIG. 1 illustrates an exemplary embodiment of a skirted toilet 10 that includes a tank 11, a pedestal 21 (or base), a seat assembly 100 and a coupling or mounting assembly (not shown). The tank 11 may include a hollow container for storing the water used during operational (or flushing) cycles, a lid (or cover) 13 for providing selective access into the bowl 12, and an actuator 14 that is configured to initiate an operational cycle when activated. The tank 11 is configured to provide flushing water to the bowl.

The actuator 14 may be a button configured to activate when depressed (or pulled) a predetermined distance or when touched, a lever configured to activate when rotated a predetermined angular travel, or any suitable device configured to activate based upon an input manipulation by a user.

It should be noted that the shapes and configurations of the tank, pedestal, seat assembly, and the internal components (including the trapway and other features) may vary from the embodiments shown and described herein, and that the embodiments disclosed herein are not intended as limitations. It should be noted, for example, that although the exemplary embodiment of the toilet 10 is shown configured with the tank 11 formed separately from the pedestal 21 and later coupled to the pedestal, the tank may be integrally formed with the pedestal as a one-piece design. In other words, the toilet may be a one-piece design, a two-piece design, or have any suitable configuration. In addition, while only gravity fed toilets are illustrated, pressure assisted toilets may also incorporate the electrostatic field generator that repel water, water droplets, or other liquids such as urine.

The installation (e.g., mounting, coupling) systems and methods may be used with a wide variety of skirted toilet configurations, and all such configurations are intended to be encompassed herein. The following description of various toilet features is therefore intended as illustration only of one possible embodiment, and it should be understood by those reviewing the present description that similar concepts or features may be included in various other embodiments.

The tank 11 may include an inlet opening configured to receive water from a coupled water supply, such as from a hose (e.g., line, tube). The tank 11 may also include an inlet valve assembly or other device configured to control the flow of water from the water supply into the tank 11 through the inlet opening. Within the tank 11 may be provided a float device for controlling the inlet valve assembly, such as by opening the valve to refill the bowl 12 of the tank 11 after an operational cycle and closing the valve when the water in the bowl 12 reaches a preset volume or height. The tank 11 may also include an outlet opening configured to transfer (e.g., conduct) the water stored in the bowl 12 of the tank 11 to the pedestal 21 (e.g., the bowl) upon activation of the actuator 14. The tank 11 may include an outlet valve assembly or other device configured to control the flow of water from the tank into the pedestal 21 through the outlet opening.

The pedestal 21 (or base) of the toilet 10 may include a wall 22 having any suitable shape that is configured to form a bowl 23 having an opening formed by an upper rim at the top of the opening. The pedestal 21 may also be configured to include a plurality of walls having varying shapes that together form a bowl having an opening formed by a rim. The wall 22 of the pedestal may extend downward and/or rearward from the bowl 23 to form a lower portion configured to support the pedestal 21 and the toilet 10. The lower portion may be formed by the end (e.g., lower rim) of the wall 22, or may include a member that extends generally in a horizontal plane from one or more than one end of the wall. The pedestal 21 may also include a top member that extends between two sides of the wall 22 (or between two opposing walls) and is provided rearward (or behind) the bowl 23, wherein the top member forms a plateau for supporting the tank 11, such as the bottom surface of the bowl 12 of the tank 11. The top member may include an inlet opening that may be aligned with the outlet opening of the tank 11, such as when the tank 11 is coupled to (or resting above) the pedestal 21, wherein water is selectively transferred (e.g., conducted) from the tank 11 through the outlet opening of the tank to the pedestal 21 through the inlet opening of the pedestal 21, when the toilet is activated through the actuator 14. The outlet valve assembly may control the flow of water from the tank to the pedestal. The toilet may also include a gasket or seal that is provided between the tank 11 and the pedestal 21 to prohibit leaking. For example, a gasket may be provided between the outlet opening of the tank 11 and the inlet opening of the pedestal to prohibit leaking between the tank 11 and the pedestal 21.

The bowl 23 of the pedestal 21 may be configured to include a receptacle (e.g., sump) and an outlet opening, wherein the water and waste is collected in the receptacle until being removed through the outlet opening, such as upon activation of the actuator 14. The pedestal 21 may also include a passageway, such as a passageway, that fluidly connects the outlet opening of the bowl 23 to an exiting or egress device (e.g., a trap or a soil pipe). The passageway generally includes a first portion, a second portion, and a weir separating the first and second portions. The first portion of the passageway may extend from the outlet opening of the bowl 23 at an upwardly oblique angle to the weir. The second portion of the passageway may extend from the weir downwardly to the exiting device, such as to the trap.

Between operational cycles of the toilet 10, the water (and waste) is collected in the first portion of the passageway (in addition to the receptacle of the bowl), such that the weir prohibits the water from passing past the weir and into the second portion of the passageway. Upon activation of the actuator 14, additional water is discharged from the tank 11 into the bowl 23 of the pedestal 21, resulting in the flushing action and waste removal through the soil pipe.

The seat assembly 100 may include a cover member 18 (e.g., lid), a seat member 19 (e.g., ring member), and a hinge 24. The seat member 19 may be configured to include an annular member that encircles an opening, wherein the annular member provides a seating surface for the user of the toilet 10. The seat member 19 may also be pivotally coupled (e.g., attached) to the hinge 24, wherein the seat member may rotate (or pivot) about the hinge 24, such as between a first lowered or seated position and a second raised or upright position. The cover member 18 may be configured to be round, oval, or any other suitable shape. Typically, the profile or shape of the outer surface of the cover member will be configured to match (i.e., to be substantially similar) to the profile of the outer surface of the seat member to improve the aesthetics of the seat assembly and toilet. The cover member 18 may also be coupled to the hinge 24, wherein the cover member may rotate (or pivot) about the hinge 24, such as between a first down lowered or down position and a second raised or upright position. The cover member 18 may be provided above the seat member in the down position to thereby cover the opening of the seat member 19, as well as to conceal the inside of the bowl 23 of the pedestal 21. The cover member 18 may be configured to rest against the outside surface of the tank 11, when the cover member 18 is in the upright position, such that the cover member 18 remains in the upright position in order for a user to sit upon the seat member 19.

The seat assembly 100 may also include an electrostatic generator 103 configured to generate a hydrophobic field that repels water or other liquids. The electrostatic generator 103 may be configured to generate an electrostatic field, as shown by field lines 101 in spatial relationship to the bathroom fixture. The field lines 101 may extend from a first side of the seat member 19. The field lines 101 may extend from an outer edge of the seat member 19 to an inner edge of the seat member 19 (i.e., in the direction of the bowl 23).

In the case of water, or another substance substantially made up of water such as urine. The term substantially made of water may mean more than 50%, or otherwise a majority, of water by volume. The water, or liquid, may have a particular charge based on the polarity of the molecules. The water molecules may have a partial positive charges, based on the hydrogen atoms and/or a partial negative charge on the oxygen atom. The unequal charge distribution of the water molecule allows the electrostatic field to place a force on the water molecule.

As urine droplets 102 approach the electrostatic field (e.g., field lines 101) of the seat member 19, a force is applied the urine droplets. The force may be at a predetermined angle. The force may be perpendicular to surface of the seat member 19. The force may be perpendicular to the surface of one or more of the agitating members 105 or 106. Any urine droplets 102 having path toward the seat member 19 are redirected toward the bowl 23 or at least away from the seat member 19.

The electrostatic field (e.g., field lines 101) forms or effectively applies a barrier over the seat member 19 that prevents urine droplets 102 from reaching the seat member 19. In some examples, the barrier may not be sufficient to redirect a direct stream of urine but may be sufficient to redirect individual drops or smaller droplets of urine. The charge of the electrostatic field may be selected based on a user input or other setting that is sufficient to redirect urine droplets.

The electrostatic generator 103 may be housed within the seat member 19. The seat member 19 is an example liquid shielded object positioned in relationship to the electrostatic generator. In this example, the bowl 23 collects liquid repelled away from the liquid shielded object by the electrostatic field.

As shown in FIG. 1, the electrostatic generator 103 may include fingers 104. The fingers 104 may be arranged on one or more agitators. As illustrated, a first agitator 105 includes multiple sets of fingers 104 spaced apart along a first circumference (e.g., approximating a first radius) along the outer edge of the seat member 19. A second agitator 106 includes multiple sets of fingers 104 spaced apart along a second circumference (e.g., approximating a second radius) along the inner edge of the seat member 19.

The fingers 104 may move relative to each other. That is the fingers 104 of the first agitator 105 may come in contact and out of contact with the fingers 104 of the second agitators 106. The rubbing, brushing, or other contact between the fingers 104 may causes an electrostatic charge to build in the electrostatic generator 103 (electrostatic charger).

The electrostatic generator 103 may be considered a passive generator. A passive generator of electrostatic fields may generate the electric field when an electrical insulator or triboelectric insulator (e.g., rubber fingers 104) is rubbed with a flexible electrical insulator (e.g., rubber fingers 104) charge of one type to move from the surface of one insulator to the surface of the other. The flexible electrical inductor may include fur, cotton, or wool, to improve this transfer of charge.

The relative movement of the rubber fingers 104 may be caused by a variety of drive mechanisms including one or more agitators that move in a predetermined pattern to generate the electrostatic field. Some examples include a control circuit or a controller (e.g., controller 301 described in more detail below) in order to command the drive mechanism to move the rubber fingers 104. Other examples may include a mechanical drive train that delivers translational or rotational motion to the drive mechanism through mechanical movement.

The movement of the fingers 104 may be caused by a motor or solenoid that is operated by the control circuit or controller. For example, one or both of the first agitator 105 and the second agitator 106 may be connected to a solenoid or motor, referred to in the alternative as the drive mechanism. The drive mechanism may be directly connected to the agitator or indirectly connected through one or more gears or other components. The drive mechanism moves the agitator in the predetermined pattern in order to cause the rubber fingers 104 and 106 to brush against each other and generate the electrostatic field 101.

The movement of the fingers 104 may be caused by manual operation. For example, the drive mechanism may omit any powered device such as a solenoid or motor and may also omit the control circuit and controller but instead include a manual handle, knob, or lever. The user grips at actuates the manual device in order to cause the rubber fingers 104 and 106 to brush against each other and generate the electrostatic field 101. For example, a charging lever may be coupled to the toilet. The user may actuate or crank the lever in order to generate the electrostatic field in the seat member 19. A similar operation may be provided by a floor mounted pedal. The user may actuate or pump the pedal in order to generate the electrostatic field in the seat member 19.

The movement of the fingers 104 may be caused by potential energy stored in the seat member 19. As the seat member 19 is raised or lowered, an energy storage device is caused to store potential energy. The energy storage device may include a spring, hydraulic fluid, or fluidlike substance (e.g., sand). For example, as the seat member 19 is moved a spring is ratcheted to store energy. When the seat member 19 is lowered to a specific position (e.g., or a switch is actuated), the potential energy is released to cause the rubber fingers 104 and 106 to brush against each other and generate the electrostatic field 101.

In the alternative to locations within the toilet seat assembly, the electrostatic generator 103 may be located under the rim within the wall 22 of the toilet 10 or in chamber mounted adjacent to the rim or on the floor adjacent to the toilet 10.

FIG. 2 illustrates another example electrostatic generator including an electrostatic plate 121 connected to at least a switch 123 and a power source 125. The electrostatic generator may be considered an active generator. An active generator of electrostatic fields may generate the electric field when an electrical bias is applied directly to the electrostatic generator, for example, onto the electrostatic plate 121 from a power source.

A switch 123 is configured to activate or deactivate the electrostatic generator. In some examples, the switch 123 is operated automatically (e.g., by the control circuit or the controller) and in other examples, the user may manually operate the switch 123 (e.g., press a button or move a physical switch).

In the instance of automatic operation of the switch 123, the controller may receive sensor data that is indicative of the usage of the toilet. For example, the controller may be in communication with a sensor 111 configured to detect a presence of a user and, in response, cause the electrostatic generator to generate the electrostatic field in response to the presence of the user (e.g., operate the drive mechanism).

The sensor 111 may include any type of sensor configured to detect certain actions and/or to provide functionality (e.g., dispensing, flushing, etc.). Odor sensors, proximity sensors, and motion sensors are non-limiting examples of sensors that may be employed with the systems of this application. Odor sensors, such as volatile organic compound (VOC) sensors, may be employed to detect organic chemicals and compounds, both human made and naturally occurring chemicals/compounds. Proximity sensors may be employed to detect the presence of an object within a zone of detection without physical contact between the object and the sensor. Electric potential sensors, capacitance sensors, projected capacitance sensors, and infrared sensors (e.g., projected infrared sensors, passive infrared sensors) are non-limiting examples of proximity sensors that may be employed with the systems of this application. Motion sensors may be employed to detect motion (e.g., a change in position of an object relative to the objects surroundings). Electric potential sensors, optic sensors, radio-frequency (RF) sensors, sound sensors, magnetic sensors (e.g., magnetometers), vibration sensors, and infrared sensors (e.g., projected infrared sensors, passive infrared sensors) are non-limiting examples of motion sensors that may be employed with the systems of this application.

In another example, the sensor 111 may include a light detection and ranging (LiDAR) that servers as a proximity sensor. The controller receives sensor data such as a point cloud, from the sensor 111 and analyzes the sensor data to determine when a user is approaching or has approached the toilet 10.

In some examples, the tank 11 may be omitted. In these examples, the water for flushing may be provided by another type of tank or through line pressure or another pressurizing device. For example, a wall mounted toilet may be coupled to a tank internal to the wall. A line in the wall coupled to the bowl is configured to provide flushing water to the bowl. The wall mounted toilet may also incorporate the electrostatic field generator that repel water, water droplets, or other liquids such as urine. The electrostatic field generator in this example may be electrically triggered by a flush plate may be mounted to the wall.

In another example, rather than a tank, a water-diverter with an inline handle may provide water pressure from a water supply system to the toilet. This type of tankless toilet may also incorporate the electrostatic field generator that repel water, water droplets, or other liquids such as urine.

In yet another example, no water such as a tank or line pressure may be used to flush the toilet 10. Such a waterless toilet may also incorporate the electrostatic field generator that repel water, water droplets, or other liquids such as urine.

In some examples, an indicator 131 may indicate the presence of the electrostatic field. A static sensor or electrostatic sensor may be placed inside, on, or adjacent to the seat member 19 to detect the generator electrostatic field. The sensor may measure a surface voltage and/or polarity of the seat member 19. The indicator 131 may illuminate when the electrostatic field exceeds a threshold value.

In other examples, the indicator 131 may indicate the operation of the electrostatic generator 103. That is, rather than indicate the presence of the electrostatic field, the indicator 131 is illuminated in response to the actuation of the electrostatic generator 103 or the switch 123.

Figure 3:
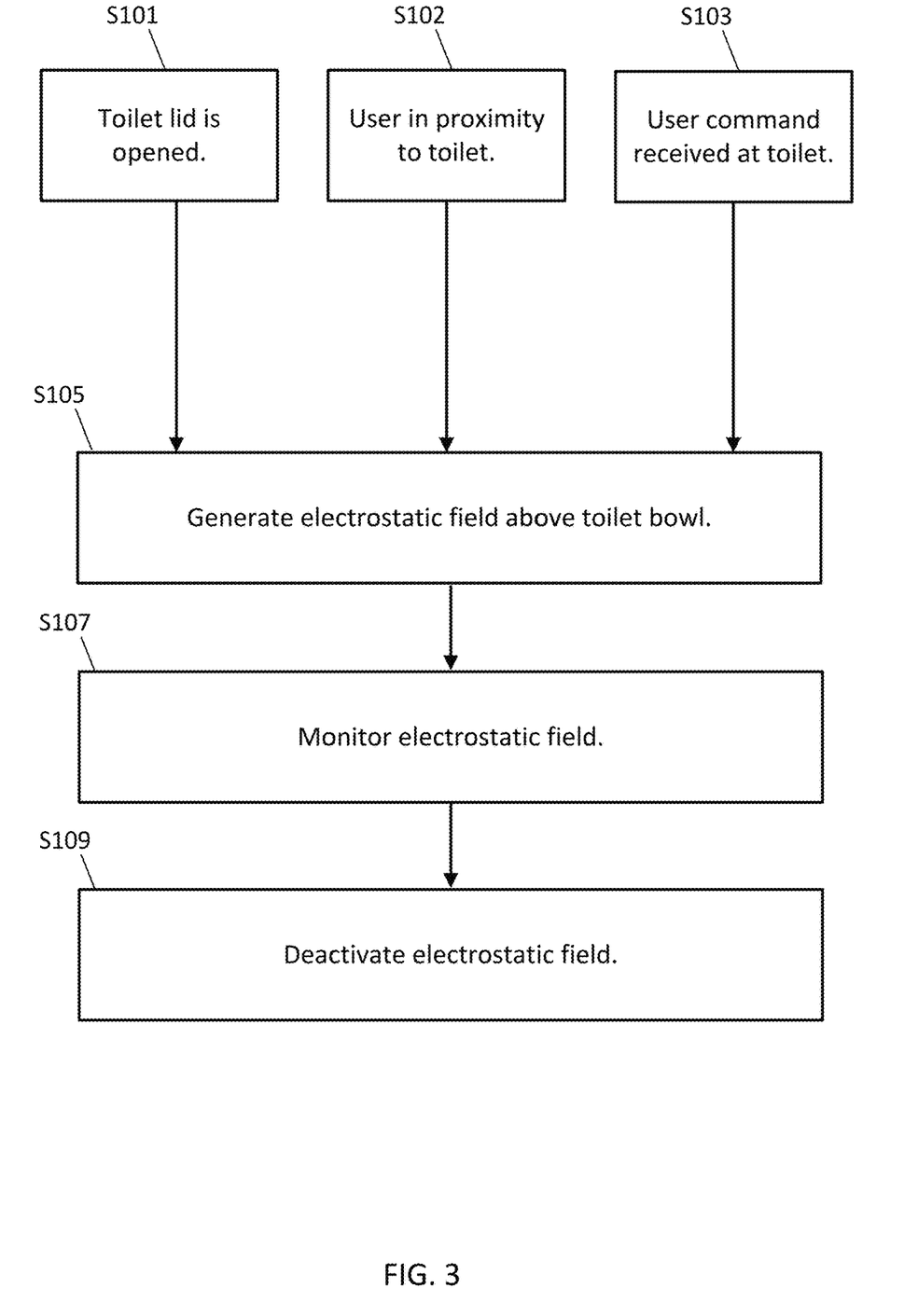
FIG. 3 illustrates a flow chart for the example toilet in the embodiment(s) of FIGS. 1 and 2.

FIG. 3 illustrates an example flow chart for the operation of the electrostatic charging system in the toilet embodiments such as illustrated in FIGS. 1 and 2. Additional, different, or fewer acts may be used.

In act S101, S102, and S103, a trigger is received at the electrostatic charging system to initiate the hydrophobic effect. The trigger can come from a combination of sources or a single source (e.g., S101, S102, or S103).

One example source includes, as shown by act S101, an operation of the lid 18. The lid 18 may include a sensor (e.g., position sensor or a mechanical switch) that detects when the lid is opened. Opening the lid 18 may indicate that the user is using the toilet with the seat member 19 down. In another example, both the lid 18 and the seat member 19 may each include sensors. The trigger for the electrostatic charging system may be associated in a condition in which the lid 18 is in the up position and the seat member 19 is in the down position.

One example source includes, as shown by act S102, a detection of the user. As described herein, the presence or proximity of a user may be determined by sensor 111. In some examples, both the conditions of act S101 and S102 are met before the electrostatic charging system is triggered. That is, the electrostatic system is triggered when both the lid 18 is in the up position and the user is in proximity to the toilet 10.

One example source includes, as shown by act S103, a user command. The user command may be generated by a button, a dial, a touchscreen, or another input mechanism for turning on or off the electrostatic charging system. The electrostatic charging system may receive user commands from a remote control or a mobile application running on a tablet, smartphone, or other mobile device. In some examples, the user command may indicate a charge level (e.g., low, medium, high, or a set number of charge).

Any one or a combination of acts S101, S102, and S103 may be used.

In act S105, the electrostatic field is generated. In some examples, the triboelectric insulator is actuated to generate the electrostatic field. In some examples, a bias is applied to a charging plate to generate the electrostatic field.

In act S107, the electrostatic field is monitored. In act S109, the electrostatic field is deactivated, or otherwise modified, in response to act S107. Through various data inputs, the controller maya be configured to detect data indicative of the electrostatic field, compare the data for the electrostatic field to a threshold, and provide an indicator of the electrostatic field or a path to ground for the electrostatic field when the data exceeds the threshold.

In some examples, feedback data is provided to the controller. For example, an electrostatic sensor measures the electrostatic field. When the feedback data reaches a predetermined charge for the electrostatic field, the field is deactivated. The field may be deactivated when a maximum electrostatic field value is reached. The field may be deactivated once a specified amount of charge has flowed to approaching water or other liquid droplets.

In some examples, the user monitors the electrostatic field and provides a subsequent user command when the electrostatic field should be deactivated. The user may depress a discharge button. The discharge button may be a pressure sensor that is tripped by applying any pressure to the toilet seat or seat member 19. The discharge button may be implemented by a foot sensor. The discharge button may be implemented through a remote control or mobile device.

In some examples, the controller or control circuit may detect an error or fault in the electrostatic charging systems such as a malfunction or a fault. An example fault may occur if water is present inside the toilet seat 19 or otherwise in contact with the electrostatic charging system. In other examples, rather than monitoring, the controller implements a timer. When a predetermined time has elapsed, the electrostatic field is deactivated.

Figure 4:
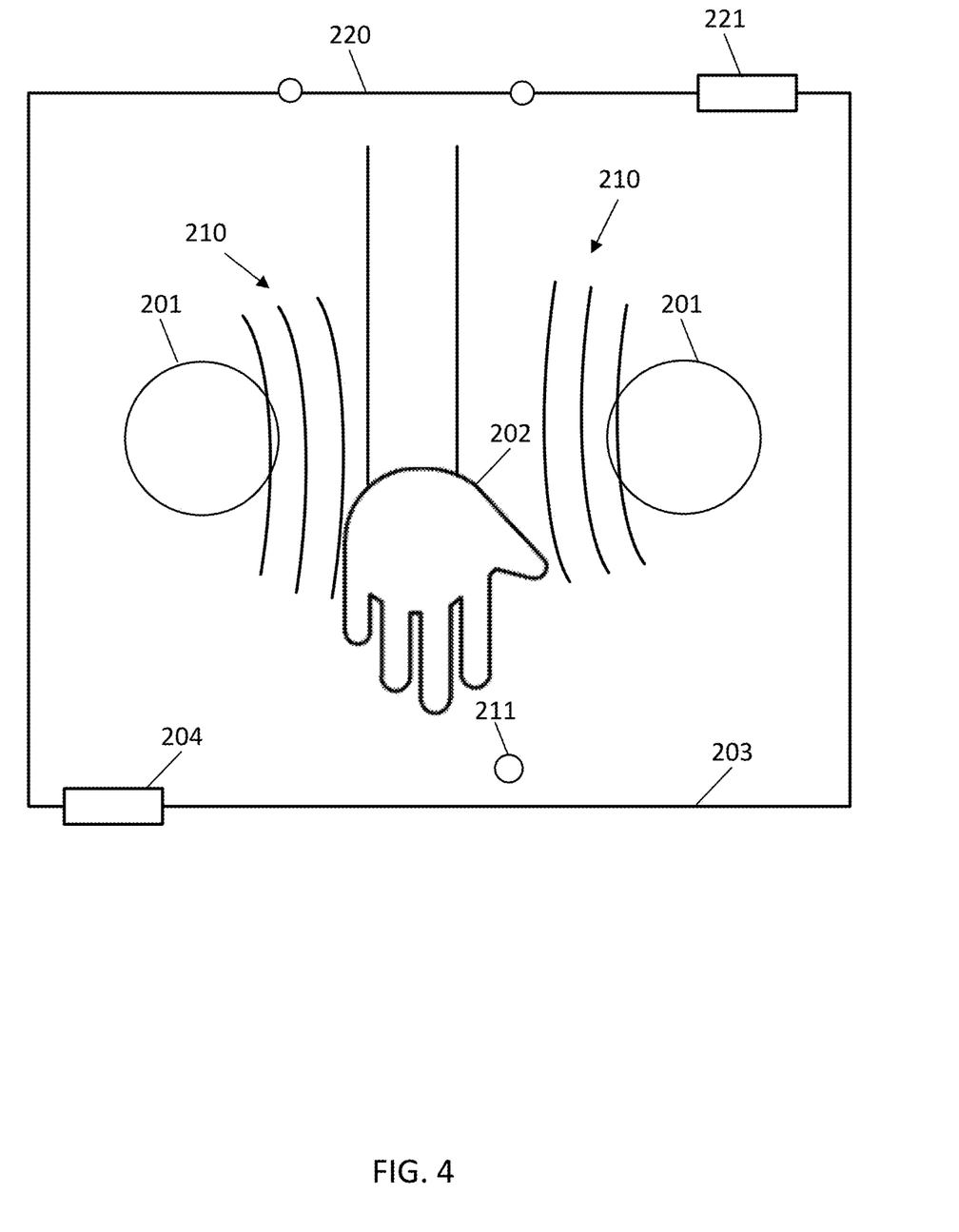
FIG. 4 illustrates an example dryer including a hydrophobic field in an initial drying state.
Figure 5:
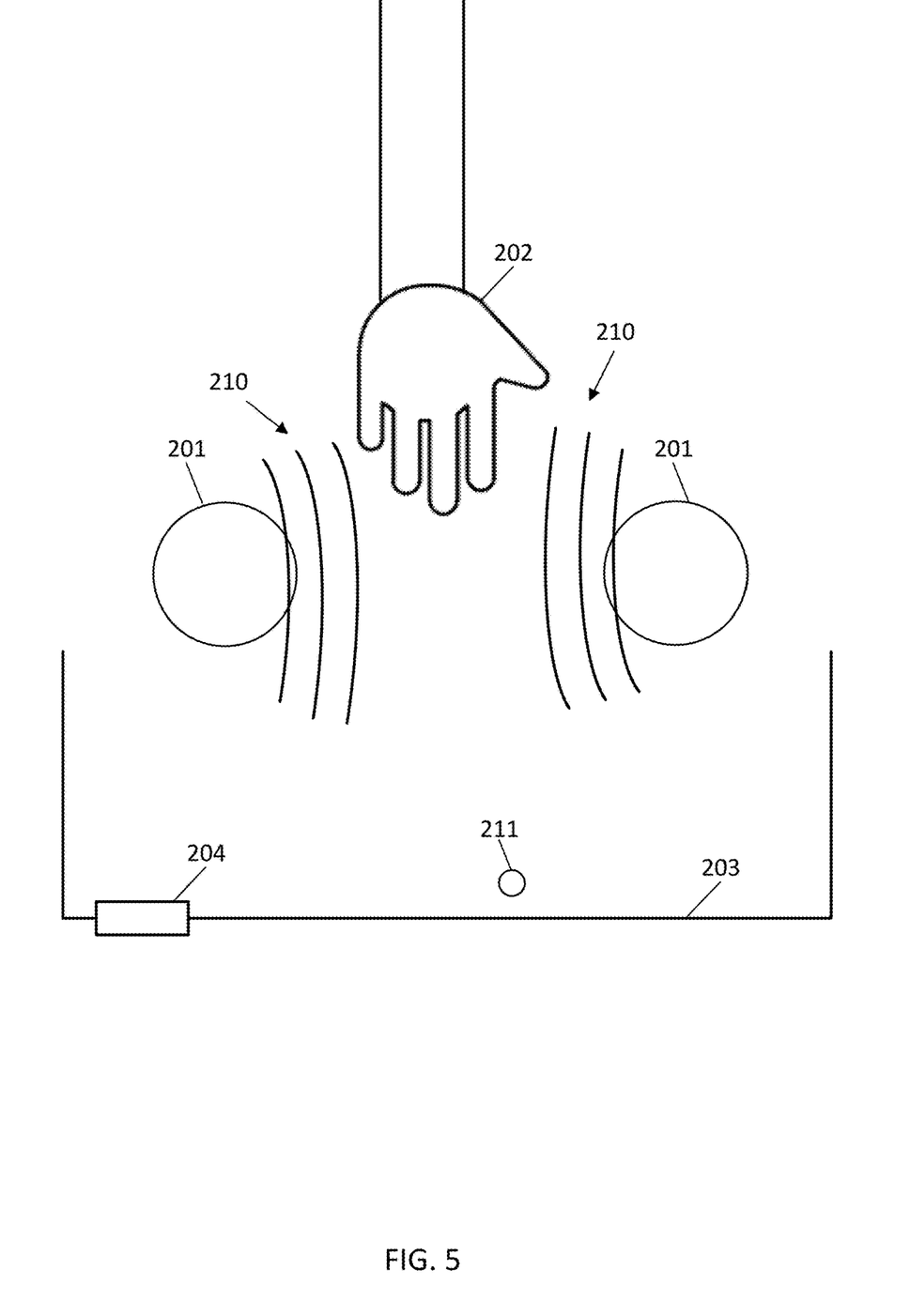
FIG. 5 illustrates an example dryer including a hydrophobic field in a subsequent drying state.

FIGS. 4 and 5 illustrate a hand dryer including an electrostatic generator 201 or a pair of electrostatic generators 201. The electrostatic generator 201 may include agitators, similar to that described above. The agitators may be moved automatically via a motor or solenoid or manually via a crank or lever in order to build up a charge and provide an electrostatic field 210. The electrostatic generator 201 may include an electrostatic plate, similar to that described above. The electrostatic plate may be provided a bias from a voltage source and/or switch to selectively control the electrostatic field 210. The electrostatic field 210 is hydrophobic in that it repels water. The partial polarity of water molecules are repelled by the electrostatic field 210.

The user may place a hand 202, two hands, or another objects into the hand dryer chassis or frame as a liquid shielded object. For example, as shown in FIG. 4, hand 202 is placed in an initial drying state between the pair of electrostatic generators 201. The initial drying state may include a position of the hand 202 below the electrostatic generators 201. FIG. 5 illustrates a subsequent drying state as the hand 202 is brought up between the electrostatic generators 201 to a position even with or above the electrostatic generators 201.

A sensor 211 may detect the presence of the hand 202 or other object. As described above with respect to sensor 111, a variety of motion sensors, proximity sensors, and/or other types of sensors such as LiDAR sensors, may be used to determine when the user is using the hand dryer. The sensor 211 may detect the position of the hand 202 below the electrostatic generators 201. The sensor 211 may detect the position of the hand 202 within the hand dryer. The sensor 211 may detect the presence of the user standing near the hand dryer.

In response to the sensor data based on the presence of the hand 202 or user, electrostatic generators 201 generate an electrostatic field that repels water away from the hand 202. The water droplets may be pushed downward into a trap, a bowl or basin 203 configured to collected liquid repelled away from the liquid shielded object by the electrostatic field. The trap 203 may include a drain that connects to a plumbing system. The trap 203 may connect to a recycled water tank or a sewer drain.

In some examples, a controller turns on the electrostatic field using a power source in response to the sensor data. In some examples, the controller activates a motor or solenoid the generate the electrostatic field in response to the sensor data using an agitator. In some examples, the user may press a button or other input to turn on the electrostatic field. The input may be located with the hand dryer. The sensor 211 may be replaced by the input.

In one embodiment, the agitator for generating the electrostatic field may be actuated by the same hand 202 that is being tried. For example, the hand 202 may push a lever in order to be placed inside the hand dryer. The hand dryer may include a door 220 (e.g., trapdoor that opens inward) that is mechanically connected to the agitators. By pushing hand 202 through the door, the agitators are rubbed together, transferring charge to electrostatic generator 201 and generating the electrostatic field 210.

In addition or the alternative, an electrostatic collector (e.g., collection plate) could be added to collect aerosols in the basin 203 or trap 204. The electrostatic collector could be formed of plastic. The electrostatic collected may be biased to attract aerosols. The electrostatic collector may be periodically cleaned to remove aerosols. The electrostatic collected may be irradiated with ultraviolet light to eliminate any living material collected by the electrostatic collector.

In another embodiment, at least one electrostatic collector is placed in strategic locations in a bathroom or commercial restroom to remove aerosols and other charged contaminants. For example, an electrostatic collector may be located near a ventilation system, on a countertop, for example near a sink, near a mirror, or other similar locations.

An electrostatic collector located near a ventilation system may be placed in strategic locations in a bathroom or commercial restroom where particles are most likely to accumulate. For example, the electrostatic collector may be located near a dehumidification system near a shower.

An electrostatic collector located on a near a mirror may be used to remove or repel moisture and/or humidity from the mirror surface. Similarly, an electrostatic collector located on or near a countertop surface may be used to remove or repel liquids, such as water, from the surface and direct the liquid toward a drain.

Similar to the hand dryer described above, an electrostatic collector includes an electrostatic generator 201 or a pair of electrostatic generators 201. The electrostatic generator 201 may include agitators, similar to that described above. The agitators may be moved automatically via a motor or solenoid or manually via a crank or lever in order to build up a charge and provide an electrostatic field 210. The electrostatic generator 201 may include an electrostatic plate, similar to that described above. The electrostatic plate may be provided a bias from a voltage source and/or switch to selectively control the electrostatic field 210. The electrostatic field 210 is hydrophobic in that it repels water. The partial polarity of water molecules are repelled by the electrostatic field 210.

A sensor 211 may detect the presence of a person, and as described above with respect to sensor 111, a variety of motion sensors, proximity sensors, and/or other types of sensors such as LiDAR sensors, may be used to determine when the electrostatic collector should be turned on. The sensor 211 may detect the presence of a person using the bathroom.

In response to the sensor data based on the presence of a user, electrostatic generators 201 generate an electrostatic field that repels water away from a surface in the bathroom. The water droplets may be pushed downward into a trap, a bowl or basin 203 configured to collected liquid repelled away from the liquid shielded object by the electrostatic field. The trap 203 may include a drain that connects to a plumbing system. The trap 203 may connect to a recycled water tank or a sewer drain.

In some examples, a controller turns on the electrostatic field using a power source in response to the sensor data. In some examples, the controller activates a motor or solenoid the generate the electrostatic field in response to the sensor data using an agitator. In some examples, the user may press a button or other input to turn on the electrostatic field.

The electrostatic collector may include an ultraviolet light source to eliminate any living material collected by the electrostatic collector.

Figure 6:
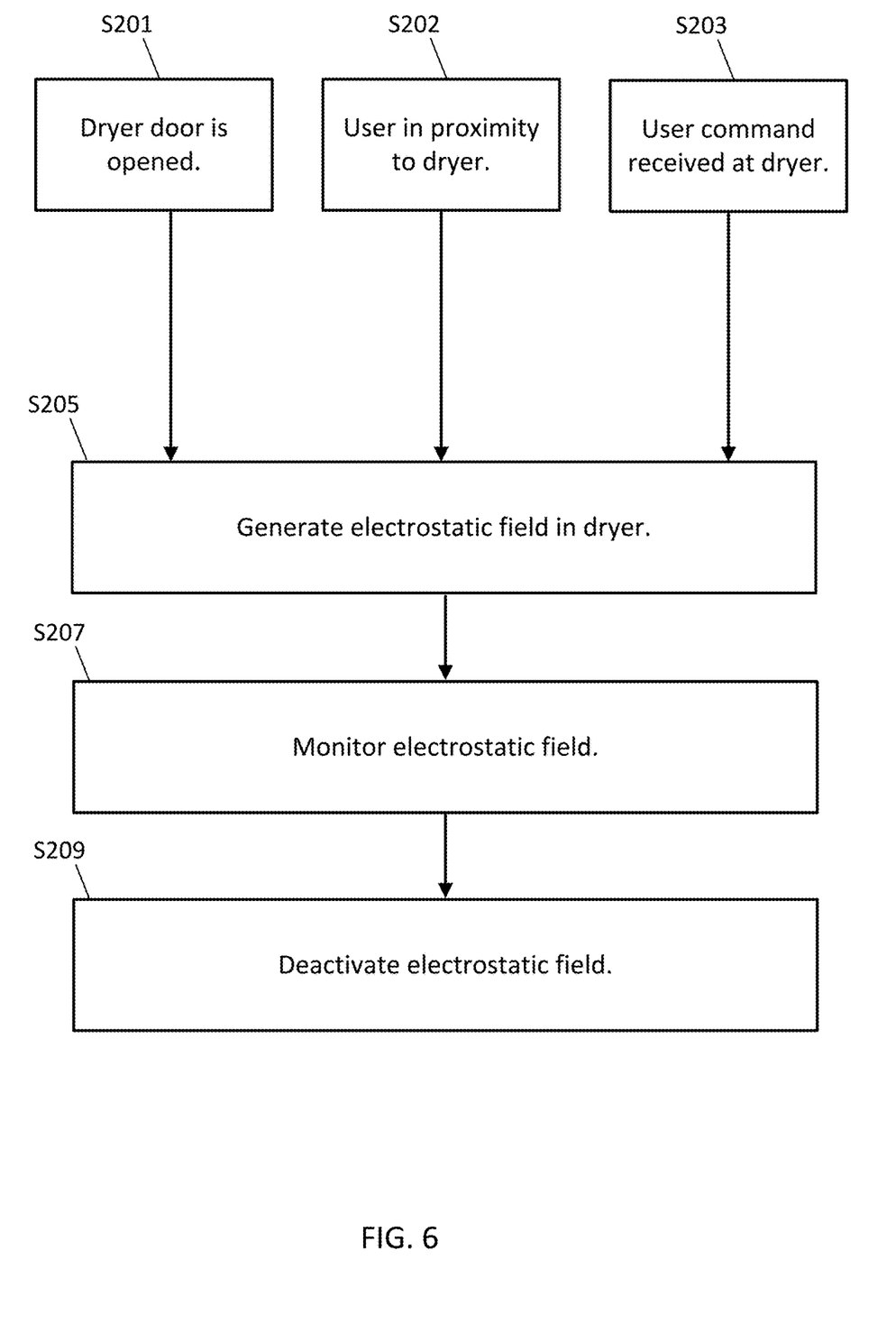
FIG. 6 illustrates a flow chart for the example toilet in the embodiment(s) of FIGS. 3 and 4.

FIG. 6 illustrates an example flow chart for the operation of the electrostatic charging system in the dryer embodiments such as illustrated in FIGS. 3 and 4. Additional, different, or fewer acts may be used.

In act S201, S202, and S203, a trigger is received at the electrostatic charging system to initiate the hydrophobic feature. The trigger can come from one or a combination of sources.

One example includes, as shown by act S201, an operation of a dryer door 220. The dryer door 220 may be a hinged flap or another mechanism that the user moves to places hands in the dryer. A sensor may detect when the dryer door has been opened and trigger the electrostatic charging system in response.

One example includes, as shown by act S202, a detection of the user in proximity to the dryer. The sensor 211 may detect hands in the dryer and/or in proximity to the electrostatic charging system.

One example includes, as shown by act S203, a user command received at the dryer. The user command may be received at an on/off button 221 on the outside of the dryer. A remote control or a mobile application may send the user command to the dryer.

Any one or a combination of acts S201, S202, and S203 may be used.

In act S205, the electrostatic field is generated. In some examples, the triboelectric insulator is actuated. For example, the controller or control circuit may operate a drive mechanism such as a solenoid or motor to move ethe triboelectric insulator to create the electrostatic field 210. In some examples, a bias is applied to a charging plate. For example, the controller or control circuit may turn on an electrical path to the charging plate to create the electrostatic field 210.

In act S207, the electrostatic field is monitored. In act S209, the electrostatic field is deactivated in response to act S207. Other responses to the monitoring are possible.

The controller or control circuit may receive data indicative of the electrostatic field 210 from one or more sources. The data may be compared to a threshold to determine whether the electrostatic field 210 has reached a predetermined level.

The predetermined level may be an operational level. In this instance, an indicator of the electrostatic field 210 may indicate that the charging system is on (e.g., green light). The predetermined level may be an error level. In this instance, the indicator of the electrostatic field 210 may indicate that the charging system is malfunctioning (e.g., red light).

In addition or in the alternative, the controller or control circuit may deactivate the electrostatic charging system by switching a path to ground to the electrostatic field when the data exceeds the threshold.

In some examples, the controller or control circuit receives feedback on the charge of the electrostatic field as data indicative of the electrostatic field 210. In some examples, a user provides the information through observations and entry to an input device.

Figure 7:
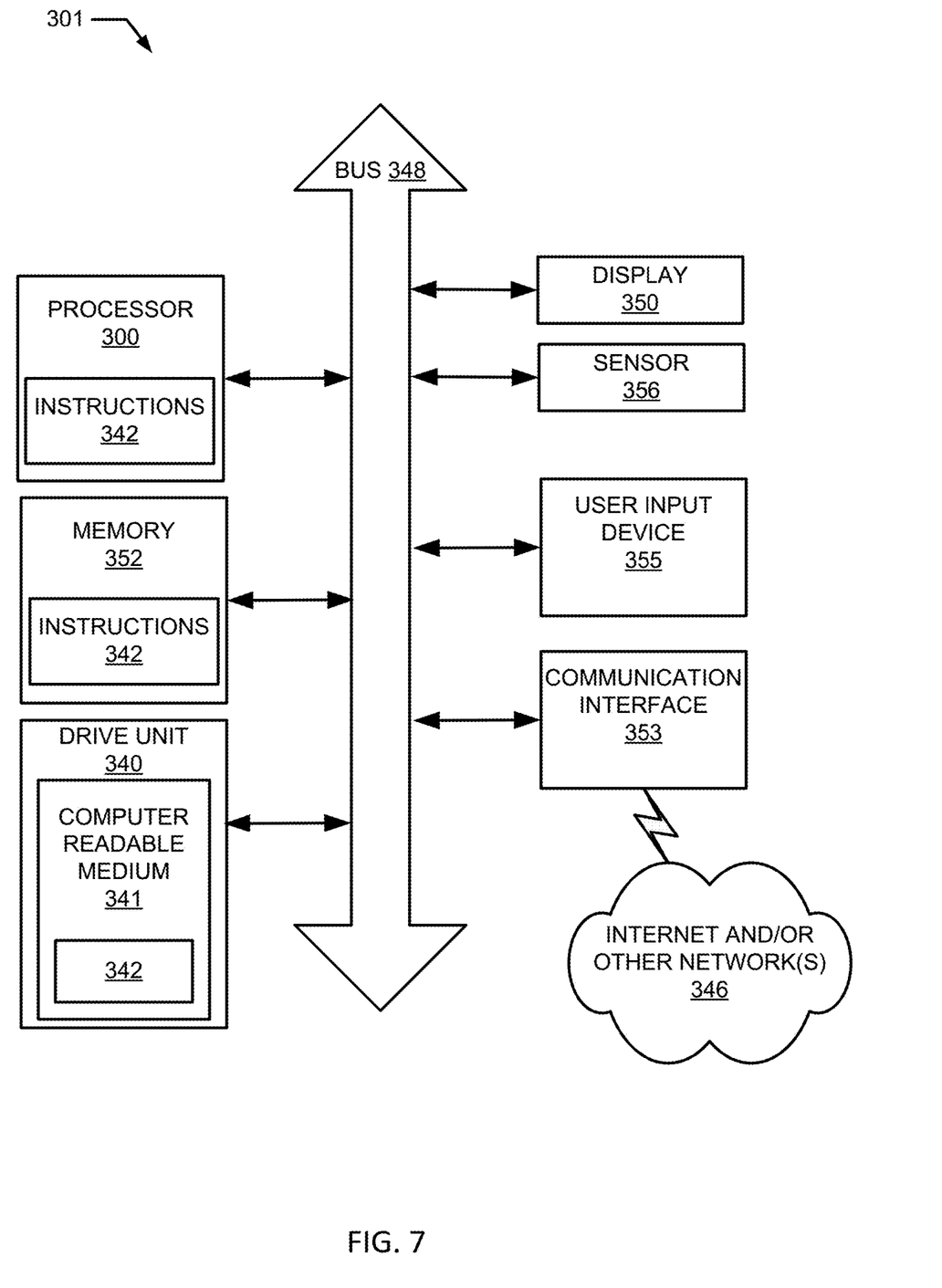
FIG. 7 illustrates an example controller for the hydrophobic field.

FIG. 7 illustrates an example control system or controller 301 for the hydrophobic generator system. The controller 301 may include a processor 300, a memory 352, and a communication interface 353 for interfacing with devices or to the internet and/or other networks 346. In addition to the communication interface 353, a sensor interface may be configured to receive data from the sensors described herein or data from any source for the position of the user. The components of the control system may communicate using bus 348. The control system may be connected to a workstation or another external device (e.g., control panel) and/or a database for receiving user inputs, system characteristics, and any of the values described herein.

Optionally, the control system may include an input device 355 and/or a sensing circuit 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be coupled with the toilet or hand dryer. The display 350 may be combined with the user input device 355.

Figure 8:
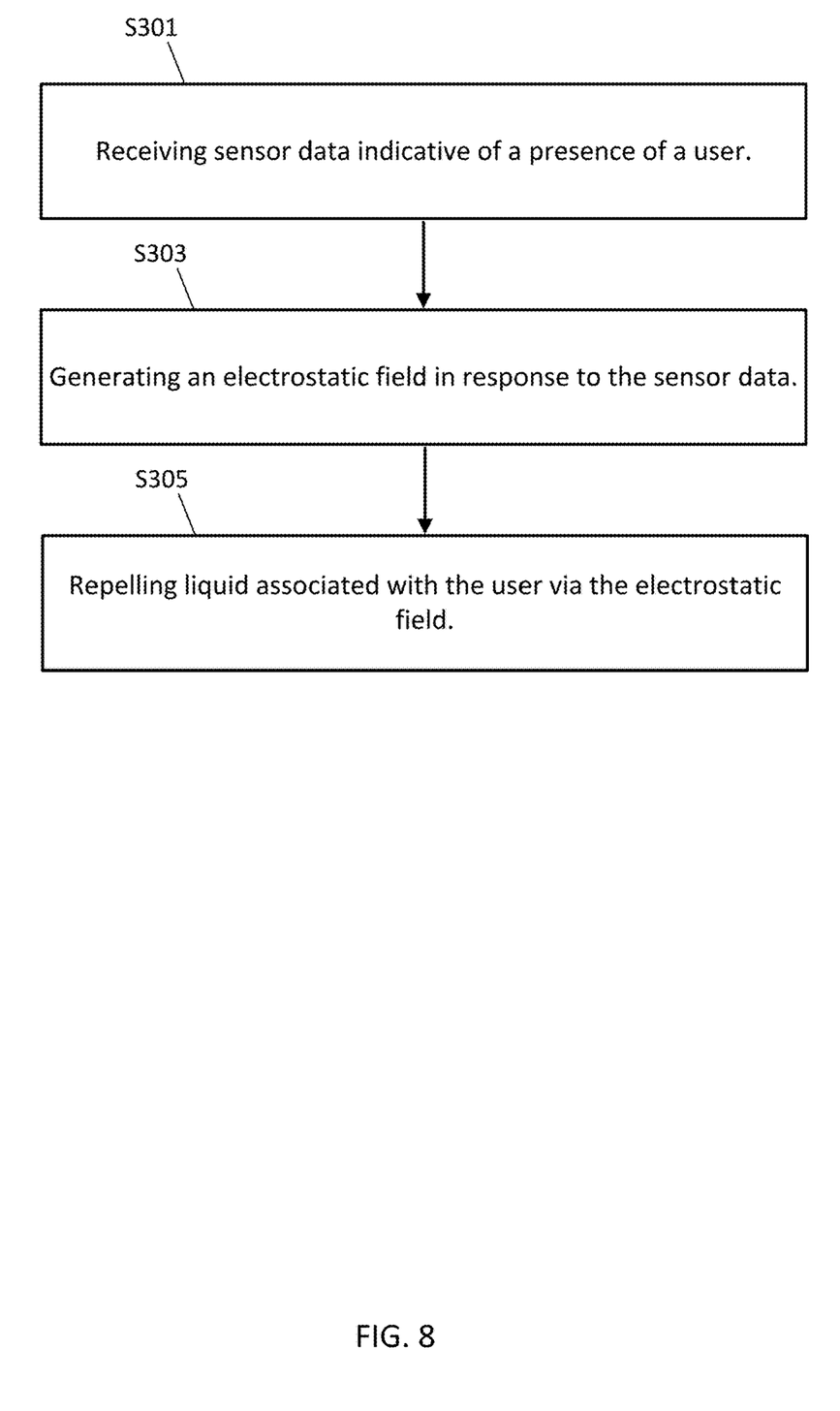
FIG. 8 illustrates a flow chart for the controller of FIG. 7.

FIG. 8 illustrates a flow chart for the control system 301 of the hydrophobic generation system. The acts of the flow chart may be performed by any combination of the control system, the network device or the server. Portions of one or more acts may be performed by the appliance. Additional, different of fewer acts may be included.

At act S301, the controller 301 (e.g., through processor 300) receives sensor data for sensor data, or a statistical parameter of the sensor data, which may be displayed at display 350 or sent to the user or a central location through the communication interface 353. The sensor data may be indicative of a user, or a body part of the user. For example, in the toilet embodiments, the sensor data may indicate that the user is near the toilet, or standing facing the toilet (e.g., a standing urination position). In the hand dryer embodiments, the sensor data may indicate that a hand or other object has been placed within range of the electrostatic field or inside of the hand dryer.

At act S303, the controller 301 (e.g., through processor 300) turns on or otherwise generates the electrostatic field in response to the sensor data. The electrostatic field may be generated or turned on in response to the sensor data. For example, a drive mechanism may be actuated in response to the drive mechanism to call insulators to rub together to generate charge. Alternatively, an electrostatic plate or Van de Graff dome may be turned on to generate charge of a predetermined polarity.

At act S305, the controller 301 (e.g., through processor 300) repels the liquid using the generated electrostatic field.

The controller 301, through the user input device 355 or received through network 345, a user may provide one or more settings for the electrostatic field or generation of the electrostatic field.

The user input may determine a polarity for the electrostatic field. The polarity may impact the direction that liquid is repelled. The user input may determine a setting strength for the electrostatic field. The field strength may dictate the distance that the liquid is repelled. The field strength may impact the size of droplets that can be repelled. The field strength may impact the speed of the droplets that can be repelled. The field strength may impact the velocity of the droplets that can be repelled. The field strength may impact the type of liquids that can be repelled (e.g., as the concentration of water is lower, a higher field strength may be used).

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Figure 9:
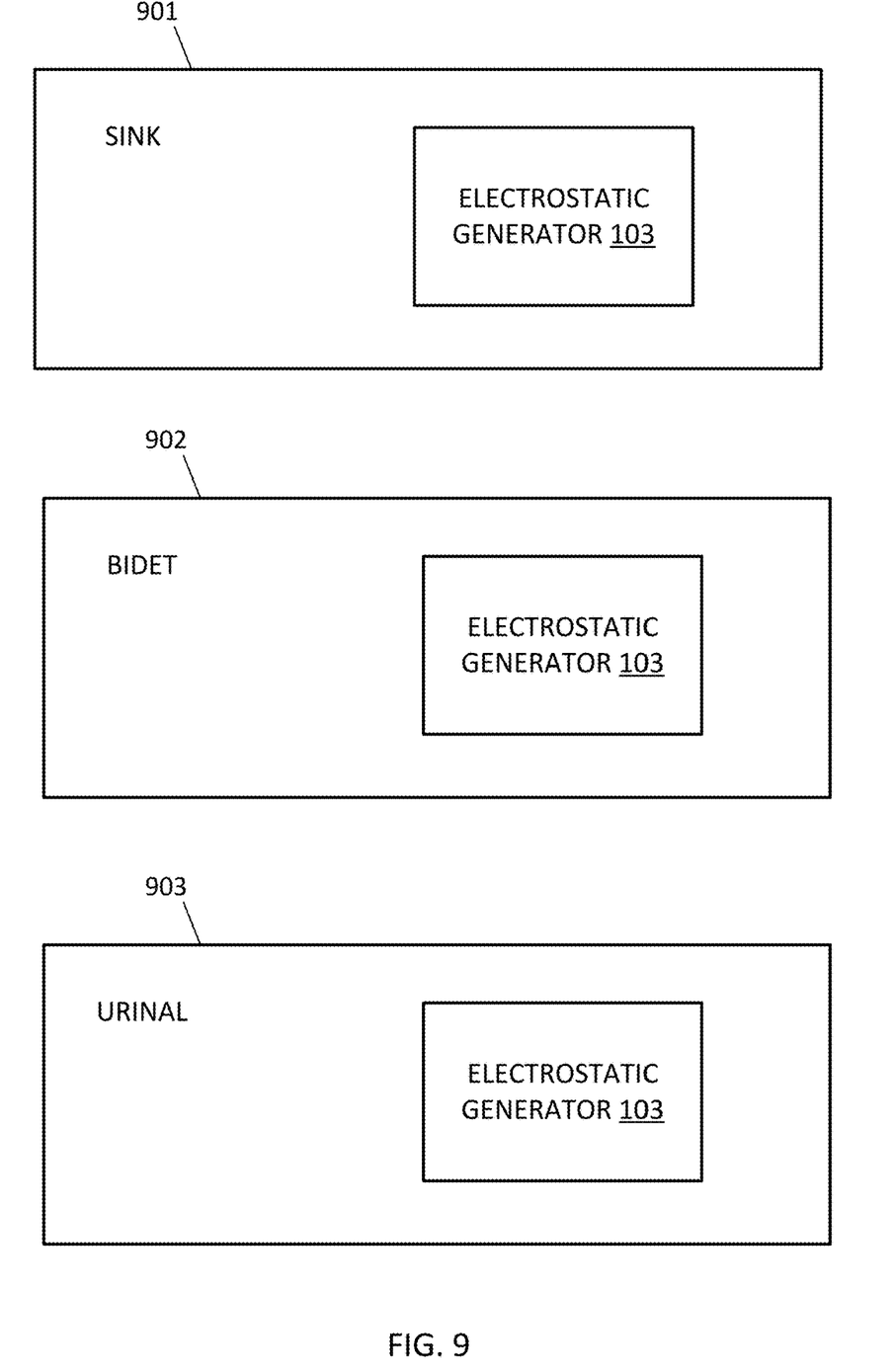
FIG. 9 illustrates additional embodiments for the electrostatic charging system.

FIG. 9 illustrates additional implementations of the electrostatic charging system. A sink 901 may be coupled with the electrostatic charging system 103. For example, the electrostatic charging system 103 may be mounted within or under the basin. In another example, the electrostatic charging system 103 may be mounted under an adjacent counter top. In another example, the electrostatic charging system may be placed on mounted on top of the countertop. Other operational, control, and sensing aspects of other embodiments described herein may be applied to the sink 901 to repel liquid.

A bidet 902 may be coupled with the electrostatic charging system 103. For example, the electrostatic charging system 103 may be mounted within or under the bidet 902 adjacent to the toilet seat 109. The toilet seat 109 and the bidet 902 may both include electrostatic charging systems 103, which may be connected mechanically and/or electrically so that the charging systems operate (turn on and off) in synchronization. Other operational, control, and sensing aspects of other embodiments described herein may be applied to the bidet 902 to repel liquid.

A urinal 903 may be coupled with the electrostatic charging system 103. For example, the electrostatic charging system 103 may be mounted within the urinal 903 such as hanging on the rim of the urinal 903. The electrostatic charging system 103 may be mounted adjacent to the urinal 903 such as on the floor or an adjacent wall. Other operational, control, and sensing aspects of other embodiments described herein may be applied to the urinal 903 to repel liquid.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An apparatus for generation and application of a hydrophobic effect at a bathroom fixture, the apparatus comprising:
   an electrostatic generator configured to generate an electrostatic field configured to repel liquid;
   a liquid shielded object positioned in relationship to the electrostatic generator; and
   a bowl or basin configured to collected liquid repelled away from the liquid shielded object by the electrostatic field.

2. The apparatus of claim 1, wherein the electrostatic generator is an active generator including a power source.

3. The apparatus of claim 2, wherein the electrostatic generator includes an electrostatic plate connected to the power source.

4. The apparatus of claim 1, wherein the electrostatic generator is a passive generator.

5. The apparatus of claim 4, wherein the electrostatic generator includes one or more agitators that move in a predetermined pattern to generate the electrostatic field.

6. The apparatus of claim 1, further comprising:
   a switch for activating or deactivating the electrostatic generator.

7. The apparatus of claim 1, further comprising:
   a sensor configured to detect a presence of a user, wherein the electrostatic generator is configured to generate the electrostatic field in response to the presence of the user.

8. The apparatus of claim 1, further comprising:
   a toilet seat including the electrostatic generator.

9. The apparatus of claim 1, wherein the bathroom fixture comprises a hand dryer including the electrostatic generator.

10. The apparatus of claim 1, wherein the bathroom fixture comprises a sink, a urinal or a bidet.

11. A toilet comprising:
    an apparatus for generation and application of a hydrophobic effect at a bathroom fixture, the apparatus comprising:
    an electrostatic generator configured to generate an electrostatic field configured to repel liquid;
    a liquid shielded object positioned in relationship to the electrostatic generator; and
    a bowl or basin configured to collected liquid repelled away from the liquid shielded object by the electrostatic field.

12. The apparatus of claim 11, wherein the electrostatic generator is an active generator including a power source.

13. The apparatus of claim 12, wherein the electrostatic generator includes an electrostatic plate connected to the power source.

14. The apparatus of claim 11, wherein the electrostatic generator is a passive generator.

15. The apparatus of claim 14, wherein the electrostatic generator includes one or more agitators that move in a predetermined pattern to generate the electrostatic field.

16. The apparatus of claim 11, further comprising:
    a switch for activating or deactivating the electrostatic generator.

17. The apparatus of claim 11, further comprising:
    a sensor configured to detect a presence of a user, wherein the electrostatic generator is configured to generate the electrostatic field in response to the presence of the user.

18. The apparatus of claim 11, further comprising:
    a toilet seat including the electrostatic generator.

19. The apparatus of claim 11, wherein the bathroom fixture comprises a hand dryer including the electrostatic generator.

20. The apparatus of claim 11, wherein the bathroom fixture comprises a sink, a urinal or a bidet.

* * * * *